March 22, 1955 E. O. CLAY ET AL 2,704,387
CANOPY SEAL
Filed April 14, 1950

INVENTORS
EUGENE O. CLAY
GEORGE R. GEHRKENS
BY
William R. Lane
ATTORNEY

United States Patent Office 2,704,387
Patented Mar. 22, 1955

2,704,387

CANOPY SEAL

Eugene O. Clay and George R. Gehrkens, Los Angeles, Calif., assignors to North American Aviation, Inc.

Application April 14, 1950, Serial No. 155,872

2 Claims. (Cl. 20—69)

This invention involves improvements in sealing elements and particularly relates to inflatable types of seals.

In sliding cockpit enclosures for fighter aircraft and the like it is necessary to provide sealing means between the enclosure members and the cockpit structure to permit pressurizing the cockpit during flight at high altitudes. Structural variations require the provision of sealing means capable of accommodating considerable latitude in spacing between the edge of the enclosure member and the adjacent structure. Further it is necessary to provide a seal which may be completely disengaged from the adjacent structure in order to permit unrestricted sliding movement of the cockpit enclosure.

It is accordingly, an object of the present invention to provide sealing means which may be inflated to provide a closure between adjacent members and which may also be totally collapsed.

It is a further object of the present invention to provide improved means for effecting the complete collapse of an inflatable type seal member.

It is a further object of the present invention to provide means for avoiding the possible entrapment of the inflating medium resulting in a residual partial inflation.

It is still a further object of the present invention to provide bleed means whereby the total collapse of the sealing element may be assured upon release of the inflating pressure.

Figure 1:
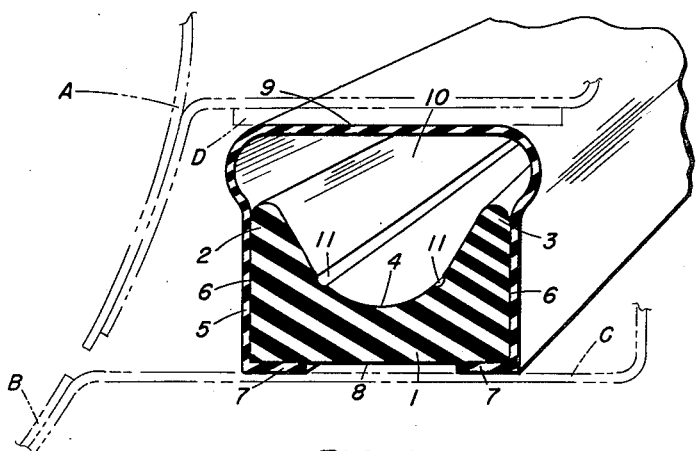

Other objects of invention will become apparent from the following description taken in connection with the accompanying drawings, in which:

Fig. 1 comprises a perspective view showing a cross-section through the improved sealing element in the inflated condition, with the adjacent structure indicated in phantom.

Figure 2:
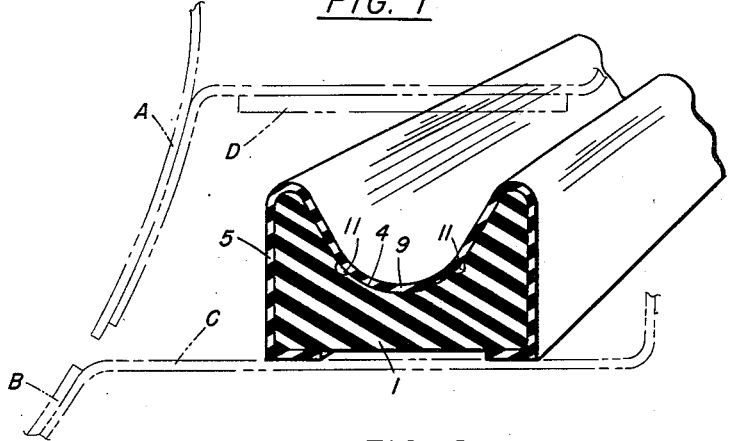
Figure 3:
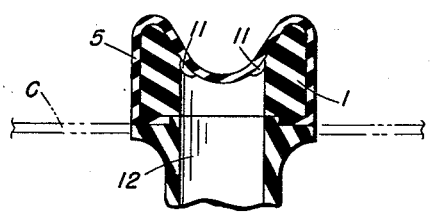

Fig. 2 is a perspective view showing a cross-section through the improved sealing element in the deflated condition, and Fig. 3 is an auxiliary cross-sectional view showing the porting for exhausting the pressurizing medium.

The subject invention comprises a sealing element usable for example for effecting a seal between a slidable member A and a fixed member B as indicated in phantom, cut in the plane of the section. The seal may be formed of a U-shaped member 1 having a pair of upwardly directed extensions 2—3 and a continuous recessed intermediate portion 4. This member may be molded or extruded of natural or synthetic rubber or like material. A resilient outer covering 5 is attached by cementing, vulcanizing, or like bonding means to the outer surfaces 6 of the member 1 and may include return portions 7 arranged for engagement with the under surface 8 of the member 1. The seal is secured to the surface C of the fixed member B. The upper portion 9 of the member 5, which is not attached to member 1, comprises a relatively thin flexible membrane capable of adapting itself when in the inflated position to various minor irregularities of a surface as indicated in phantom at D upon the movable member A against which it bears in sealing contact. The portion 9 will assume the approximate position shown in Fig. 1 under the influence of fluid pressure introduced into the area 10 through appropriate pressure controlling and valving units, not shown.

The member 5 is so formed that the portion 9 will normally assume a collapsed position as shown in Fig. 2, being received in the recess 4 of member 1. The member 5 may not require stretching to accomplish sealing contact when inflated, being accordion like in its displacement. Upon release of the fluid pressure from the area 10 the member 5 will be released from sealing contact with the adjacent surface. This member 5 on release of the inflating pressure tends to return to the fully deflated position indicated and totally collapsed, the portion 9 will correspond substantially with the surface of the recess 4 of the member 1.

To prevent the possible entrapment in localized areas of the fluid medium introduced into the area 10, grooves 11 are provided in the upper surface of the area 4 of the member 1. These grooves are continuous throughout the length of the member 1 and connect with an exhaust port 12 as shown in Fig. 3 to provide means for preventing the inadvertent entrapment of fluid medium as has been occasioned in the past. The grooves 11 provide means for effecting the complete deflation of the sealing membrane 5 throughout the entire length of the seal. In the past the portion 9 thereof has moved into contact with the surface 4 before the area 10 which forms the inflation chamber has become evacuated throughout the length of the seal. This condition has been noted to be particularly difficult in seal installations which may be of considerable length as for example about the entire periphery of an aircraft cockpit canopy. The grooves 11 will permit the fluid from the extremities of the seal to reach the outlet port 12 despite the collapse of intermediate sections of the cover 5 adjacent the outlet.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A sealing device comprising an elongated base member having upwardly projecting opposite side portions, and a concave substantially semi-cylindrical upper surface portion therebetween, said upper surface portion having a plurality of relatively small axially extending continuous grooves therein; a flexible sheet sealing member attached in fluid tight relationship to and extending from the entire length of said side portions; and fluid pressure controlling means for introducing fluid pressure between said sealing member and said upper surface portion to extend said sealing member to a position remote from said upper surface portion, and for exhausting said fluid pressure, said sealing member being complementary to and adapted to lie in abutting engagement with said upper surface portion when said fluid pressure is exhausted, said grooves communicating with said fluid pressure controlling means for thereby providing a continuously open exhaust passage when said flexible member is in engagement with said upper surface.

2. A sealing device comprising an elongated flexible base member having a substantially semi-cylindrical concave upper surface, the bottom portion of said upper surface being provided with a plurality of continuous axially extending relatively narrow grooves therein; a flexible sheet member attached to said base member extending the length thereof and disposed over said upper surface of said base member, said sheet member being complementary to and adapted to abuttingly engage said upper surface, said base member having a single opening for permitting intake and exhaust of inflating fluid between said sheet member and said base member, whereby when such fluid is so admitted said sheet member is extended to form a sealing means, said grooves in said surface of said base member being in open communication with said opening whereby when said inflating fluid is exhausted from between said sheet member and said base member said grooves provide a continuously open exhaust passage for such fluid.

References Cited in the file of this patent

UNITED STATES PATENTS

| | | |
|---|---|---|
| 2,301,963 | Marple et al. | Nov. 17, 1942 |
| 2,306,990 | Essl | Dec. 29, 1942 |